United States Patent Office 3,518,917
Patented July 7, 1970

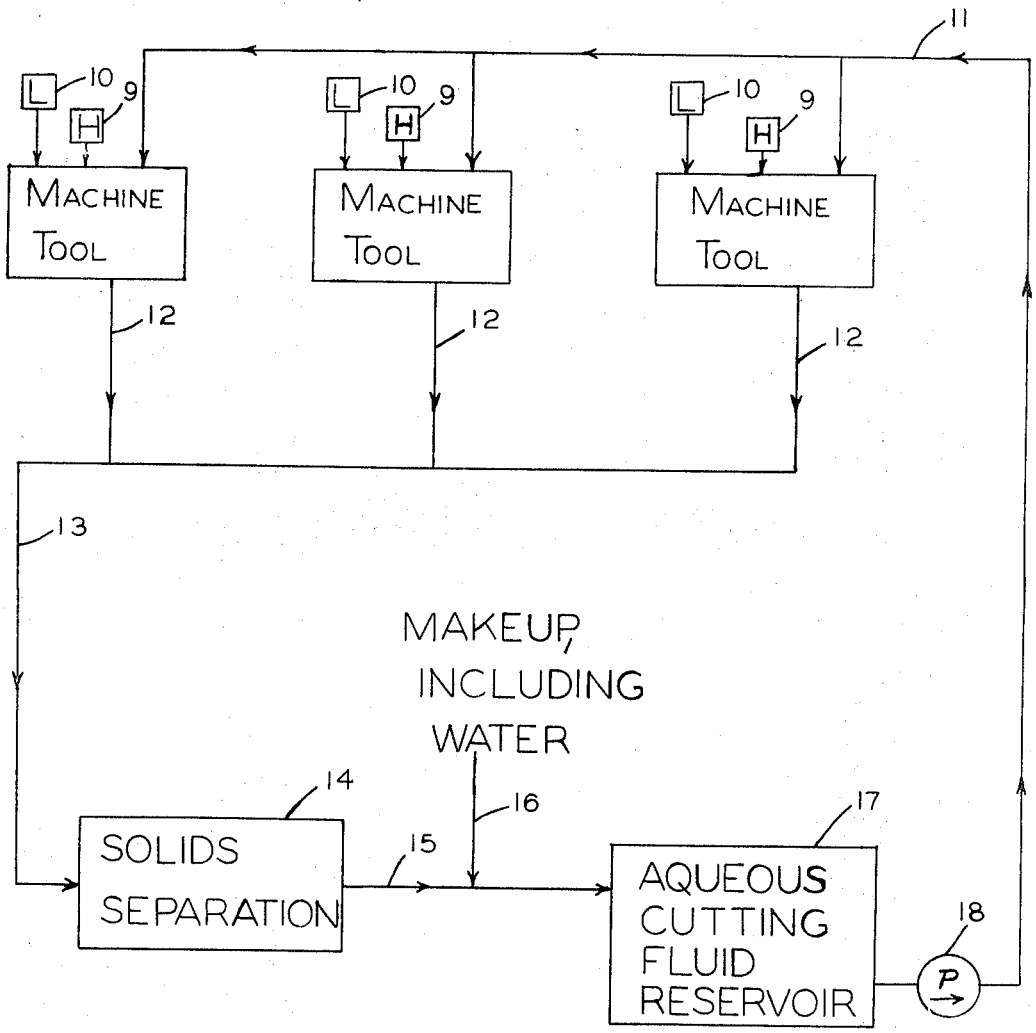

3,518,917
METHOD OF SUPPLYING FLUIDS TO
MACHINE TOOLS
Clyde A. Sluhan, Perrysburg, Ohio, assignor, by mesne
 assignments, to Metal Chemicals Incorporated, Perrysburg, Ohio, a corporation of Ohio
Filed Feb. 7, 1969, Ser. No. 797,486
Int. Cl. B23c 1/00; F16n 39/00; B24b 55/07
U.S. Cl. 90—11                                      3 Claims

ABSTRACT OF THE DISCLOSURE

In the operation of at least one machine tool having at least one cutting tool, at least one spindle, at least one slide and at least one hydraulic system, a fluid lubricant is fed to the spindle and to the slide, while a hydraulic fluid is supplied to the hydraulic system. Each such fluid consists essentially of a mixture of substances of the class consisting of water-soluble polyoxyalkylene diols and their water-soluble esters and ethers. At the same time, an aqueous cutting or grinding fluid is fed to the cutting tool. The overflow of the fluid lubricant and the leakage of the hydraulic fluid are mingled with the overflow of the aqueous fluid, and the commingled fluids are collected. Then solids and insoluble materials are removed from the commingled fluids to regenerate an aqueous cutting fluid. The composition of the regenerated aqueous fluid is adjusted by adding ingredients thereto, and the regenerated aqueous fluid is then recirculated to the cutting tool.

Background of the invention

Aqueous cutting and grinding fluids are used in large quantities for lubricating and cooling the cutting tools used in machining operations such as: drilling, boring, milling, honing and grinding. In a plant which contains a number of machine tools it is common practice to employ a central system to supply the cutting or grinding fluid to all the machines and to collect the overflow of such fluid from these same machines. The collected overflow of cutting or grinding fluid upon return to the central system is treated to remove solids, and is stored in a reservoir from which it is pumped back to the cutting tools which are to be lubricated and cooled.

The function of the cutting or grinding fluid is to lubricate the cutting tool, to act as a coolant, and to flush away chips and other debris in order to keep the work relatively clean. In order that the cutting or grinding fluid may perform these functions it is necessary to supply a relatively large flow of fluid to each machine. Thus in a large plant the total amount of cutting fluid in the system at any one time may amount to several hundred thousand gallons.

The moving parts of a machine tool other than the cutting tool, such as spindles, slides and gears, must be lubricated constantly while the machine tool is in operation, although the flow of lubricant required for the lubrication of such parts is much smaller than the flow of cutting fluid required by the machine tool. Likewise the hydraulic system of the machine must be supplied with hydraulic fluid while the machine tool is in operation. For lubricating moving parts of a machine tool such as spindles, slides, screws and gears, it is customary to employ a water-insoluble fluid lubricant, usually a mineral oil. Likewise a mineral oil is commonly used to actuate the hydraulic mechanisms of a machine tool.

Although the flow of water-insoluble lubricant and water-insoluble hydraulic fluid required to lubricate the spindles, slides and gears and to actuate the hydraulic mechanisms of a machine tool is relatively small compared to the flow of cutting or grinding fluid, it has been found that these water-insoluble lubricants and hydraulic fluids leak into the aqueous cutting or grinding fluid in the operation of a machine tool, so that these water-insoluble materials are carried into the central system and thus contaminate the aqueous cutting or grinding fluid with incompatible materials. As the aqueous cutting or grinding fluid in a plant is used over and over, the concentration of water-insoluble materials such as mineral oil in the aqueous cutting or grinding fluid increases. Part of the insoluble oil floats to the top where it can be skimmed off. A centrifuge will remove even more of this insoluble oil, but part of the insoluble oil becomes mixed into the aqueous fluid as a tight emulsion.

In a central system for recycling an aqueous cutting or grinding fluid, the cutting or grinding fluid is pumped back to the machine tools by relatively large pumps. These pumps and the turbulence in the pipe lines tend to emulsify any water-insoluble lubricants and hydraulic fluids which are present in the system.

The insoluble, emulsified oils affect the cutting or grinding fluid in several important ways: the increased viscosity impairs the cooling action; the dispersed droplets of oil provide a large oil-water interfacial area which is conducive to the growth of bacteria; the oil phase preferentially absorbs those chemicals which are more oil soluble, upsets the balanced composition of the aqueous cutting or grinding fluid and disrupts the performance of the surfactants; the emulsification of insoluble oils may cause excessive foaming of the cutting or grinding fluid during the metalworking operation; and because of the increased viscosity and the presence of water-insoluble materials, the aqueous fluid tends to form a sludge with minute particles of abrasives and other debris. Recirculated, these particles scratch the work piece. Eventually the concentration of water-insoluble lubricants and hydraulic fluids in the aqueous fluid builds up to such a level that the aqueous cutting or grinding fluid becomes rancid or will no longer function properly.

Another difficulty which is caused by an appreciable amount of water-insoluble lubricants and hydraulic fluids emulsified in an aqueous cutting or grinding fluid is that the water-insoluble lubricants or hydraulic fluids are atomized during the cutting or grinding operation. Although water vapor generated during the cutting or grinding operation from an aqueous fluid ordinarily is not objectionable, an atomized water-insoluble lubricant or hydraulic fluid forms a persistent mist which is very obnoxious to the operator of the machine tool.

Because of the difficulties which are caused by contamination of aqueous cutting or grinding fluids with water-insoluble lubricants and hydraulic fluids, various installations have been constructed for removal of such contaminants. One such installation which has been employed consists of a large settling tank in which part of the water-insoluble oils gradually separate to form a layer upon the surface of the aqueous fluid in the tank. However, tightly emulsified oils cannot be separated.

Even when attempts have been made to separate contaminating water-insoluble oils from aqueous cutting or grinding fluids, the difficulties caused by such contaminants have persisted, and such contaminants have caused progressive deterioration including degeneration by bacterial growth. Thus in a large plant it is often necessary to discard several hundred thousand gallons of aqueous fluid prematurely because of contamination with water-insoluble lubricants and hydraulic fluids. Such premature discarding of the aqueous fluid not only entails substantial expense for the cost of a fresh supply of fluid, but also requires that the plant be shut down for a substantial time for emptying, cleaning and refilling the system. More-over, the discarding of a large volume of degenerated aqueous cutting or grinding fluid, contaminated with water-insoluble oils, creates a serious waste disposal or stream pollution problem.

Summary of the invention

It is an object of the present invention to eliminate the difficulties that have arisen from contamination of aqueous cutting and grinding fluids with mineral oils and other water-insoluble fluids and lubricants employed for lubricating and hydraulically actuating moving parts of machine tools such as spindles, screws, gears and slides.

The present method of lubricating and hydraulically actuating machine tools provides a system in which the various lubricants and hydraulic fluids are so chosen and so handled that the aqueous cutting or grinding fluid does not become contaminated, for it absorbs these lubricants and hydraulic fluids and they become an integral and functional part of the aqueous cutting or grinding fluid. In this way the aqueous cutting or grinding fluid can be reused indefinitely without any necessity for separating foreign and incompatible lubricants or foreign and incompatible hydraulic fluids therefrom.

In accordance with the present method, there is fed to the spindles and slides and to the hydraulic actuating mechanisms of machine tools fluids each of which consists essentially of a mixture of substances of the class consisting of water-soluble polyoxyalkylene diols and their water-soluble ethers and esters, having the proper physical properties and compatibility with the aqueous cutting or grinding fluid which is fed to the cutting tools. The overflows of the lubricant, hydraulic fluid and cutting or grinding fluid are mingled at each machine tool. The commingled overflows are collected from the machine tool or tools, the solids are removed to regenerate a clean cutting or grinding fluid, and from time to time the composition of the aqueous cutting or grinding fluid is adjusted by the addition of makeup water, surfactants, germicides, corrosion inhibitors and lubricants as required.

Brief description of the drawing

The drawing is a flow diagram illustrating the method of the present invention.

Description of the preferred embodiments

The compositions used for lubricating the spindles and slides and actuating the hydraulic mechanism of the machine tools in the practice of the present method differ from compositions heretofore used for such purposes in that the compositions used in the present method are water-soluble materials rather than water-insoluble materials. One advantage of the water-insoluble mineral oils heretofore used for lubricating the spindles and slides and actuating the hydraulic mechanisms of machine tools is that the mineral oils commonly used are excellent corrosion preventive agents. However, any water that enters a reservoir containing a water-insoluble mineral oil will not dissolve therein, but will separate in a "pocket," where it may cause severe localized corrosion. Since the compositions used in the practice of the present method are water-soluble, any water which enters the lubricating or hydraulic system will be miscible with the fluid therein and will not produce localized corrosion. The lubricating and hydraulic fluids used in the practice of the present invention require incorporation of corrosion inhibitors and other additives, and while substantially anhydrous fluids are most desirable, it may be necessary to include a small proportion of water in order to facilitate the incorporation of corrosion inhibitors and other additives. The proportion of water should be small enough so that it does not substantially reduce the viscosity of the fluid.

The principal ingredients in lubricating and hydraulic fluids which are used in the practice of the present invention are water-soluble polyoxyalkylene diols and their water-soluble ethers and esters. Among these substances, the polyoxyalkylene diols themselves are preferred. Polyoxyalkylene diols, as well as their esters and ethers, are generally available only in the form of complex mixtures in which the individual molecules differ in size and in the arrangement of the various groups which form the molecule.

Polyoxyalkylene diols

A water-soluble polyoxyalkylene diol used in the practice of the present method preferably is a mixture comprising molecules in which the polyoxyalkylene chains are formed predominantly of oxyethylene groups and oxy 1,2-propylene groups. Oxybutylene groups may also be present. Such a mixture may be prepared by reacting water or a glycol with an alkylene oxide mixture consisting essentially of ethylene oxide and 1,2-propylene oxide, or with 1,2-propylene oxide alone. If 1,2-propylene oxide is used alone, the reaction preferably is controlled so that the resulting mixture has an average molecular weight between 200 and 1,000.

The preferred mixture for use in the present method is one which can be prepared by reaction of water or a dihydric alcohol with a mixture of ethylene oxide and 1,2-propylene oxide containing at least one part by weight of 1,2-propylene oxide for every three parts by weight of ethylene oxide. Such a reaction is an addition reaction in which the alkylene oxide molecules are converted into oxyalkylene groups. The product of such a reaction is a complex mixture of polyoxyalkylene diols, having polyoxyalkylene chains of different lengths and different internal configuration. Most of the molecules contain both oxyethylene groups and oxy 1,2-propylene groups. The molecules in such a mixture differ from one another both in size and in the various random arrangements of the oxyethylene groups and the oxy 1,2-propylene groups. The random distribution of the oxyethylene and oxy 1,2-propylene groups in the mixture of molecules results from the concurrent reaction of ethylene oxide and 1,2-propylene oxide with the water or dihydric alcohol used as a starting material.

Specific procedures for carrying out such as reaction are described in U.S. Pat. No. 2,425,845.

In a mixture of ethylene oxide and 1,2-propylene oxide which is reacted with water or with a glycol to produce a mixture of polyoxyalkylene diols for use in the practice of the present method, the proportion by weight of ethylene oxide preferably is at least 25 percent, and the proportion by weight of 1,2-propylene oxide preferably is between 25 and 75 percent. A content of at least 25 percent of ethylene oxide in the mixture of oxides is desirable in order that the reaction product may have high water solubility, while a content of at least 25 percent by weight of 1,2-propylene oxide in the mixture of oxides which is reacted with water or a glycol is desirable in order that the resulting mixture of polyoxyalkylene diols may have a relatively low solidification temperature.

The mixture of water-soluble polyoxyalkylene diols used in the practice of the present method preferably has a viscosity of 3 to 100 centistokes at 210° F. The viscosity of the mixture varies with its average molecular weight, and also is greater with a higher ratio of oxyethylene groups to oxy 1,2-propylene groups.

The average molecular weight of a mixture of water-soluble polyoxyalkylene diols used in the practice of the present method may range from 200 to 5,000, but preferably is between 400 and 4,000.

A unique feature of the polyoxyalkylene diols which are used in the present method is their water solubility. Heretofore lubricants and hydraulic fluids for use in machine tools have been prepared in a water-insoluble state. In the present method the polyoxyalkylene diols used in the lubricants and hydraulic fluids are prepared in water-soluble state by limiting the average molecular weight of the mixture of polyoxyalkylene diols to a relatively low value as hereinbefore described, and/or by limiting the proportion of oxy 1,2-propylene and higher oxyalkylene radicals to oxyethylene radicals. For maximum water-solubility of the mixture of polyoxyalkylene diols, a mixture of ethylene oxide and 1,2-propylene oxide which is reacted with water or with a dihydric alcohol preferably contains not more than 50 percent by weight of 1,2-propylene oxide.

The density of the mixture of polyoxyalkylene diols increases as the ratio of oxyethylene groups to oxy 1,2-propylene groups increases. The density of the mixture may range from 0.97 to 1.03, measured in grams per cc. at 210° F.

In the preparation of a mixture of water-soluble polyoxyalkylene diols for use in the present method, a mixture of ethylene oxide and 1,2-propylene oxide may be reacted with water or with a dihydric alcohol such as ethylene glycol, 1,2-propylene glycol, 1,3-propylene glycol, a butylene glycol, diethylene glycol, dipropylene glycol, triethylene glycol, tripropylene glycol or any other dihydroxy aliphatic compound. The amount of water in the reaction mixture has a strong influence upon the average molecular weight of the reaction product, and the average molecular weight of the reaction product may be increased by reducing the amount of water in the reaction mixture.

The reaction may be conducted by bringing the reactants into intimate contact in a liquid phase, in the presence of a strongly alkaline catalyst such as sodium hydroxide or potassium hydroxide in an amount from 0.2 to 1.0 percent by weight of the reactants. The catalysts should be uniformly dispersed throughout the liquid reaction phase.

Preferably the reaction is conducted at a temperature from 90 to 130° C., by introducing ethylene oxide and 1,2-propylene oxide in the selected proportions to the reaction zone, at such a rate as to maintain in the reaction zone a substantially uniform pressure between 5 and 50 pounds per square inch gauge. Preferably, air is swept out of the reaction vessel before the start of the reaction by use of a stream of inert gas such as nitrogen, and agitation of the reaction vessel during the reaction is desirable.

At the end of the reaction, the alkaline catalyst may be neutralized, for example by addition of carbon dioxide, to produce a salt which may be in the form of a precipitate which can be filtered from the reaction products.

The preferred starting material for reaction with a mixture of ethylene oxide and 1,2-propylene oxide is diethylene glycol. The preferred ratio of the two oxides is a ratio of equal parts by weight. Usually the weight of dihydric alcohol employed for the reaction is equal to between one third and one fifth the weight of the mixture of oxides used.

If desired, conventional additives may be incorporated in the mixture of water-soluble polyalkylene diols which is used in the present method. For example a conventional anti-oxidant such as an aromatic amine may be incorporated if the composition is to be used as a lubricant for spindles or other parts which are to be operated at temperatures above 150° F. or under oxidizing conditions.

Ethers of polyoxyalkylene diols

A water-soluble ether of a polyoxyalkylene diol which is used in the practice of the present method preferably is a mixture comprising molecules in which the polyoxyalkylene chains are formed predominantly of oxyethylene groups and oxy 1,2-propylene groups. Such a mixture may be prepared by reacting a monohydric alcohol with an alkylene oxide mixture consisting essentially of ethylene oxide and 1,2-propylene oxide.

The preferred mixture of ethers for use in the present method is one which can be prepared by reaction of a monohydric alcohol with a mixture of ethylene oxide and 1,2-propylene oxide containing from one to three parts by weight of 1,2-propylene oxide for every three parts by weight of ethylene oxide. The product of such a reaction is a complex mixture of polyoxyalkylene diol mono-ethers, having polyoxyalkylene chains of different lengths and different internal configuration. Most of the molecules contain both oxyethylene groups and oxy 1,2-propylene groups. Specific procedures for carrying out such a reaction are described in U.S. Pat. No. 2,425,755.

In a mixture of ethylene oxide and 1,2-propylene oxide which is reacted with a monohydric alcohol to produce a mixture of mono-ethers for use in the practice of the present method, the proportion by weight of ethylene oxide preferably is at least 50%, in order that the reaction product may have adequate water solubility, and the proportion by weight of 1,2-propylene oxide preferably is at least 25% in order that the reaction product may have a relatively low solidification temperature.

The mixture of mono-ethers for use in the practice of the present method may have a viscosity of 3 to 100 centistokes at 210° F. The average molecular weight of the mixture may range from 500 to 5,000, but preferably is between 500 and 2,000.

Care must be taken to provide a water-soluble mixture of mono-ethers, by limiting the average molecular weight of the mixture to a relatively low value as hereinbefore described, and by limiting the proportion of 1,2-propylene oxide to a relatively low value in the mixture of oxides which is reacted with a monohydric alcohol to produce the mixture of mono-ethers. For maximum water-solubility of the mixture of mono-ethers, the mixture of ethylene oxide and 1,2-propylene oxide which is reacted with a monohydric alcohol preferably contains not more than 40% by weight of 1,2-propylene oxide.

Preferably, the mixture of ethylene oxide and 1,2-propylene oxide is reacted with a monohydric alcohol having from one to four carbon atoms, such as methyl, ethyl, butyl or isobutyl alcohol. A mixture of monohydric alcohols also may be used for the reaction.

The reaction may be conducted by bringing the reactants into intimate contact in a liquid phase, in the presence of a strongly alkaline catalyst such as sodium hydroxide or potassium hydroxide in an amount from 0.2 to 1.0 percent by weight of the reactants.

Preferably the reaction is conducted at a temperature from 100 to 130° C., by introducing ethylene oxide and 1,2-propylene oxide in the selected proportions to the reaction zone at such a rate as to maintain a substantially uniform pressure between 5 and 50 pounds per square inch gauge. Preferably, air is swept out of the reaction vessel before the start of the reaction by means of a stream of inert gas such as nitrogen, and the reactants are agitated during the reaction.

Since the oxides react with water, it is desirable to conduct the reaction under anhydrous conditions, although the presence of a trace of moisture is not objectionable.

At the end of the reaction, the alkaline catalyst may be neutralized, for example by introduction of carbon dioxide, to produce a salt in the form of a precipitate which can be filtered from the reaction products.

The weight of monohydric alcohol employed for the reaction usually is from 1% to 20% of the weight of the mixture of oxides used. As the amount of monohydric alcohol increases, the molecular weight of the reaction product tends to decrease.

Di-ethers of polyoxyalkylene diols, for use in the practice of the invention, may be prepared by etherifying the terminal hydroxy group of the mono-ethers which have been described. For example, the terminal hydroxy group of any of the mono-ethers which have been described may be converted to an ethoxy group by reaction of the mono-ether with di-ethyl sulphate. Also, di-ethyl sulphate may be reacted, instead of with the di-ether, with the corresponding polyoxyalkylene diol, to produce a di-ethyl ether of the diol.

In such a reaction, from 2 to 4 mols of di-ethyl sulphate may be used for each mol of diol, and from 1 to 2 mols of di-ethyl sulphate may be used for each mol of monoether reacted therewith. In addition, 2 mols of an alkali metal hydroxide such as sodium hydroxide, is used in the reaction for each mol of di-ethyl sulphate. Dibutyl ether or toluene may be used as a solvent, if desired. The reaction may be carried out by stirring together at a temperature of 70 to 80° C. all of the ingredients except the di-ethyl sulphate. The di-ethyl sulphate is then added slowly while limiting the temperature to a maximum of about 95° C. After the addition of the di-ethyl sulphate, the reaction mixture is stirred at a temperature between 90 and 100° C. for three to five hours to complete the reaction. The reaction product is washed several times with water at 80° C. or is neutralized with carbon dioxide or phosphoric acid. The product is then stripped by heating under vacuum to a temperature of 185° C. until a gauge pressure below 20 mm. has been attained, and the final product is filtered to remove salts.

Another method of preparing a di-ether consists in reacting the diol with about 8 mols of an organic halide per mol of the diol, or reacting 1 mol of the mono-ether with about 4 mols of an organic halide, together with about 1.25 mols of sodium hydroxide for each mol of organic halide. The reactants may be diluted with an equal weight of toluene, and heated to a temperature between 100 and 140° C. for 20 to 30 hours to complete the reaction. The reaction product is filtered, washed with water, and then stripped and filtered as hereinbefore described.

In the di-ethers so prepared, the terminal groups may be the same or different saturated aliphatic hydrocarbon radicals having from 1 to 8 carbon atoms, such as methyl, ethyl, propyl, butyl or octyl radicals. Organic halides which may be used for the reaction with a diol or with a mono-ether include butyl chloride, octyl chloride and 2-ethyl butyl chloride.

Specific procedures for preparing such di-ethers are described in U.S. Pat. No. 2,520,611.

Esters of polyoxalkylene diols

A water-soluble mono- or di-ester of a polyoxyalkylene diol for use in the practice of the present method may be prepared by reacting a polyoxyalkylene diol hereinbefore described with a fatty acid or with a fatty acid chloride or an anhydride. Since the polyoxyalkylene diol is a mixture, the mono- or di-ester prepared therefrom also is a mixture.

The mixture of polyoxyalkylene diols from which the ester is prepared preferably is obtained by reaction of water or a dihydric alcohol with a mixture of ethylene oxide and 1,2-propylene oxide. Preferably such mixture of oxides contains at least 50% of ethylene oxide, in order that the ester may have high water-solubility, and contains at least 25% by weight of 1,2-propylene oxide in order that the ester may have a relatively low solidification temperature.

The average molecular weight of the mono- or di-esters used in the practice of the present method may range from 400 to 4,000.

The mixture of polyoxyalkylene diols may be substantially completely esterified by reacting with 2 mols of a fatty acid for each mol of diols, and may be partially esterified by reacting with less than 2 mols of a fatty acid for each mol of the diols. The number of mols of diols used for the reaction is calculated on the basis of the average molecular weight of the diol mixture. The reaction of the diol mixture with a fatty acid may be conducted in the presence of a mineral acid catalyst such as sulphuric acid, and an entraining agent such as benzene or diisopropyl ether may be used to assist in removing the water formed as a by-product of the reaction. The fatty acid used preferably is one having not more than 12 carbon atoms, such as acetic, propionic, butyric, 2-ethyl butyric, 2-ethyl hexanoic or lauric acid. In place of acetic or propionic acid, it is often convenient to use the acid anhydride.

In place of a fatty acid or anhydride, the corresponding acid chloride, such as ethyl hexoyl chloride, may be reacted with the mixture of diols, without the use of a catalyst. The acid chloride may be added to the mixture of diols over a period of one to two hours at 25 to 40° C., with stirring, and the stirring may then be continued while carbon dioxide is blown through the reaction product for about five hours to remove the hydrochloric acid. The product may then be stripped of excess acid chloride and hydrochloric acid by heating to 130° C. at a pressure of 12 mm.

Mono-esters free from di-esters also may be prepared by using a mono-ester of ethylene or propylene glycol in place of a mono-hydric alcohol, using the procedure hereinbefore described for the preparation of a mono-ether.

Specific procedures for preparing esters of polyoxyalkylene diols are described in U.S. Pat. No. 2,457,139.

Lubricant

In the practice of the present invention, a fluid lubricant that consists essentially of a mixture of substances of the class consisting of water-soluble polyoxyalkylene diols and their water-soluble esters and ethers is used for lubricating the spindles and slides of machine tools, while an aqueous fluid is fed to the cutting tools of the machine tools. It is to be understood that such a lubricant is used for lubricating not only the spindles and slides, but also various other moving parts of the machine tools other than cutting tools, such as screws and gears.

The diol, ether or ester which is used should be one which has the proper molecular weight to provide a lubricant of the desired viscosity. In general, an ester has a slightly lower viscosity than a diol or ether of similar molecular structure and molecular weight.

Because of the fact that the diols, esters and ethers used in the lubricant in the practice of the present invention are water-soluble, they are likely to have an appreciable water content and therefore to be corrosive. In order to prevent corrosion by the lubricant used in the practice of the present invention, a corrosion inhibitor such as triethanolamine borate, or any other corrosion inhibitor, may be incorporated in the lubricant. Other conventional additives which may be incorporated in the lubricant used in the practice of the present invention include coupling agents such as glycol ethers and extreme pressure additives such as triethanolamine oleate.

A typical example of a lubricant which may be used in the practice of the present invention is a polyoxyalkylene diol which is a product of the reaction of 1 part by weight of di-ethylene glycol, 2 parts by weight of ethylene oxide and 2 parts by weight of 1,2-propylene oxide, to which has been added an amount of triethanolamine borate equal to 1 percent by weight of the diol.

Another example of a lubricant is a polypropylene glycol having an average molecular weight of about 400 to which has been added 2% of its weight of a condensation product of formaldehyde and monoethanolamine which serves as a germicide and as a corrosion inhibitor.

Hydraulic fluid

A hydraulic fluid functions not only to transmit pressure, but also to lubricate parts of the hydraulic mechanism such as pistons.

The hydraulic fluid which is used in the practice of the invention may be the same as the lubricant employed. However, a relatively low viscosity is desirable in a hydraulic fluid, so that the diol, ether or ester selected for use in the hydraulic fluid preferably has a viscosity between 3 and 20 centistokes at 210° F.

As in the case of the lubricant, the unique characteristic of the hydraulic fluid used in the practice of the invention is its water-solubility, which is due to the water-solubility of the diol, ether or ester which is the principal ingredient of the hydraulic fluid or lubricant.

Aqueous cutting or grinding fluid

Any desired aqueous cutting or grinding fluid may be used in the practice of the present method. The principal ingredient of an aqueous cutting or grinding fluid is water, which acts as a cooling medium and as a carirer for the other ingredients of the fluid. The proportion of water in an aqueous cutting or grinding fluid may range from 75 to 99%, and commonly is from 90 to 97% by weight.

Another essential ingredient of an aqueous cutting or grinding fluid is a substance which imparts lubricating properties. Such a substance may be anionic, cationic or non-ionic. The water-soluble polyoxyalkylene diols and their water-soluble ethers and esters are non-ionic and therefore are compatible with an anionic or a cationic system.

Often it is advantageous in the present method to employ an aqueous cutting or grinding fluid in which the lubricating substance is a mixture of water-soluble diols, ethers and/or esters similar to the mixtures which are used as the lubricant and as the hydraulic fluid. When that is done, the leakage and accumulation in the aqueous cutting or grinding fluid of the mixtures of water-soluble diols, ethers or esters which are used as the lubricant and as the hydraulic fluid will not essentially change the composition of the aqueous cutting or grinding fluid, because a similar mixture constitutes one of the principal ingredients of the aqueous cutting or grinding fluid. As the water-soluble diols, ethers or esters continue to accumulate in the aqueous cutting or grinding fluid, the proportions of the other ingredients in the aqueous fluid will gradually decrease. Such gradual decrease in the relative proportions of the other ingredients of the aqueous fluid can be prevented by making periodic additions of such other ingredients in the quantities required to maintain the concentrations of such ingredients at their initial values. In this way, the initial composition of the aqueous cutting or grinding fluid can be preserved substantially unchanged in the practice of the present method.

In place of a mixture of water-soluble diols, ethers or esters, which are non-ionic, the aqueous cutting or grinding fluid used in the practice of the present method may contain a lubricating ingredient which is anionic or cationic. In that case, it will still be true that the mixtures of water-soluble diols, ethers or esters used as a lubricant and as a hydraulic fluid will gradually accumulate in the aqueous cutting or grinding fluid. Such gradual accumulation will not contaminate the aqueous fluid, but will gradually change the lubricating ingredients of the aqueous fluid as more and more of the mixtures of water-soluble diols, ethers or esters accumulate in the aqueous fluid, in addition to the anionic or cationic lubricating ingredient initially present in the aqueous fluid.

A typical anionic lubricating ingredient which may be used in the aqueous cutting or grinding fluid in the practice of the present method is a reaction product of boric acid and an aliphatic amine having from one to three aliphatic radicals each of which contains from one to four carbon atoms and has at least one hydroxy group attached to a carbon atom. Such an anionic lubricating ingredient is described in U.S. Pat. No. 2,999,064. Examples of such an ingredient include triethanolamine borate, ethanolamine borate and diethanolamine borate.

Examples of cationic lubricating ingredients which may be used in the aqueous cutting or grinding fluid in the practice of the present method include certain borates and benzoates of complex amines, as disclosed in U.S. Pat. No. 3,186,946. Complex amines whose borates and benzoates may be employed are prepared by reaction of a long-chain primary amine with acrylonitrile, followed by hydrogenation to produce a secondary amine in which one of the hydrogen atoms which was attached to the nitrogen atom in the original primary amine has been replaced by an aminopropyl group. Polyoxyethylene derivatives whose borates or benzoates may be used as lubricating ingredients in the aqueous cutting fluid may be prepared also by reacting either a long-chain primary amine, or a secondary amine prepared as described above, with from two to five equivalents of ethylene oxide.

Another lubricating ingredient which may be used in an aqueous cutting fluid in the practice of the present method, to increase the load-carrying capacity of the aqueous cutting fluid for heavy-duty applications, is a salt of an unsaturated fatty acid having from 18 to 22 carbon atoms with a water-soluble amine such as triethanolamine, diethanolamine or ethanolamine. Examples of such unsaturated fatty acids are oleic acid and linoleic acid.

The aqueous cutting fluid used in the practice of the present method may contain other conventional additives, such as silicone anti-foam agents, and substances which act as corrosion inhibitors. Suitable corrosion inhibitors include alkali metal borates and alkali metal nitrites, which act as agents to inhibit corrosion of steel. Substances that inhibit the corrosion of copper and other nonferrous metals, such as the sodium salt of mercaptobenzothiazole, may also be incorporated in the aqueous cutting fluid if desired.

Other conventional ingredients which may be incorporated in the aqueous cutting fluid are germicides such as the sodium salts of mercaptobenzothiazole and dithiocarbamic acid.

The principal ingredient of the aqueous cutting fluid used in the practice of the present method is the non-ionic, cationic or anionic lubricating agent, as hereinbefore described. The other ingredients are present in the solution in relatively small proportions. A typical formula for an aqueous cutting fluid is as follows:

| | Parts |
|---|---|
| Water | 100 |
| Non-ionic, cationic or anionic lubricating agent | 4 |
| Triethanolamine oleate | 1 |
| Potassium nitrite | 0.5 |
| Sodium dithiocarbamate | 0.1 |

In the above formula, the parts are by weight.

Another aqueous cutting or grinding fluid that may be used consists of a 2 to 3% aqueous solution of a composition consisting of 98 parts by weight of a polypropylene glycol having a molecular weight of about 400 and 2 parts by weight of a condensation product of formaldehyde and monoethanolamine. When an aqueous solution of this composition is used as the aqueous cutting or grinding fluid, it is advantageous to use the same composition as the lubricant and as the hydraulic fluid.

In the practice of the present method, the hydraulic system of at least one machine tool is supplied with a hydraulic fluid under pressure from a reservoir 9. At the same time, a lubricant is fed from a reservoir 10 to the moving parts of each machine tool, such as spindles, slides, screws and gears, other than the cutting tools. The lubricant is fed from each reservoir 10 by gravity flow, or by means of a metering pump, at the proper rate of flow to keep the various moving parts of the machine tool adequately lubricated.

The hydraulic fluid, like the lubricant, consists essentially of a mixture of substances of the class consisting of water-soluble polyoxyalkylene diols and their water soluble esters and ethers, as hereinbefore described. Although the hydraulic fluid and the lubricant may be identical, usually the hydraulic fluid will consist of a mixture of substances having a lower average molecular weight and lower viscosity than the mixture of substances which consistutes the lubricant.

An aqueous cutting or grinding fluid is supplied to the cutting tool of each machine tool from a supply main 11.

The overflow of the cutting or grinding fluid at each machine tool is collected in a suitable sump, and the leakage of the hydraulic fluid, together with the overflow of the lubricant from the spindles and slides also enters the same sump, where it mingles with the overflow of the aqueous cutting or grinding fluid. From the sump of each machine tool, a discharge line 12 leads to a common discharge main 13.

The common discharge main 13 in turn leads to solids separation apparatus 14, which is conventional in construction and may include filters, magnetic separators and centrifuges for separating the solids such as chips from machining operations and abrasives from grinding operations.

The fluid recovered in the solids separation apparatus flows through a return line 15 to which is connected a water supply line 16. Usually the water content of the fluid entering the return line 15 is less than the water content of the fluid supplied from the main 11, because of loss of water by evaporation, and because of leakage or overflow of the water-soluble hydraulic fluid and the water-soluble lubricant from the reservoirs 9 and 10. Accordingly, the water content of the fluid entering the return line 15 is measured, and sufficient water is introduced through the water supply line 16 to dilute the fluid in the return line 15 so as to restore the water content to its initial value. Similarly, the minor additives contained in the fluid entering the return line 15 may be measured, and further quantities of such additives may be introduced through the water line 16 in order to restore the original concentration of such additives.

The recovered fluid then enters the storage reservoir 17.

Before the system is started up, the storage reservoir 17 is filled with a supply of aqueous cutting or grinding fluid of the desired composition. With a properly adjusted flow of water and minor additives entering the system through the water line 16, the concentrations of water and minor additives in the fluid returning to the reservoir 17 will be substantially the same as the concentrations in the aqueous cutting or grinding fluid with which the reservoir 17 was initially filled.

A pump 18 is used to circulate the aqueous cutting or grinding fluid back to the machine tools from the reservoir 17.

I claim:

1. A method of lubricating and hydraulically actuating at least one machine tool having at least one cutting tool, at least one spindle, at least one slide and at least one hydraulic system, comprising the steps of (a) feeding to such spindle and to such slide a fluid lubricant that consists essentially of a mixture of substances of the class consisting of water soluble polyoxyalkylene diols and their water soluble esters and ethers, (b) supplying to such hydraulic systhem a hydraulic fluid that consists essentially of a mixture of substances of the class consisting of water soluble polyoxyalkylene diols and their water soluble esters and ethers, (c) feeding to such cutting tool an aqueous fluid of the class consisting of aqueous cutting and grinding fluids, (d) mingling the overflow of the fluid lubricant and the leakage of the hydraulic fluid with the overflow of the aqueous fluid, (e) collecting the commingled fluids, (f) removing solids and insoluble materials from the commingled fluids to regenerate an aqueous fluid, (g) adjusting the composition of the regenerated aqueous fluid by adding ingredients thereto, and (h) recirculating the regenerated aqueous fluid to such cutting tool.

2. A method according to claim 1 wherein the aqueous fluid initially fed to the cutting tool is an aqueous solution of a mixture of substances of the class consisting of water soluble polyoxyalkylene diols and their water soluble esters and ethers.

3. A method according to claim 1 wherein the hydraulic fluid is supplied and the lubricant and aqueous fluid are fed simultaneously to a plurality of machine tools.

References Cited

UNITED STATES PATENTS 2,384,225  9/1945  Wilson _____ 51—267
2,578,040  12/1951  Booth et al. _____ 51—267 X GIL WEIDENFELD, Primary Examiner U.S. Cl. XR.

51—267; 77—55; 82—34; 184—1